Feb. 20, 1945.   E. G. JOHANSSON   2,370,043
METER MOUNTING
Filed April 9, 1942   2 Sheets-Sheet 1
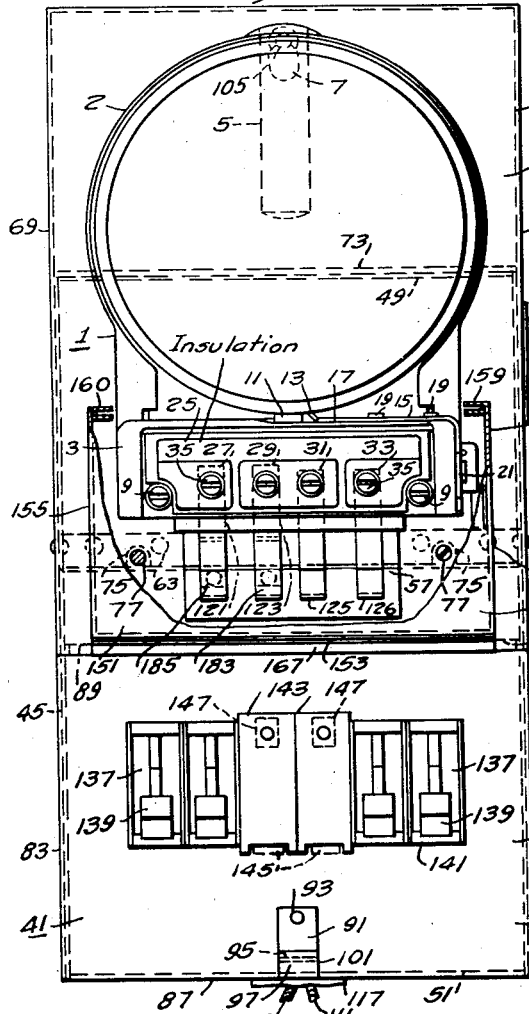
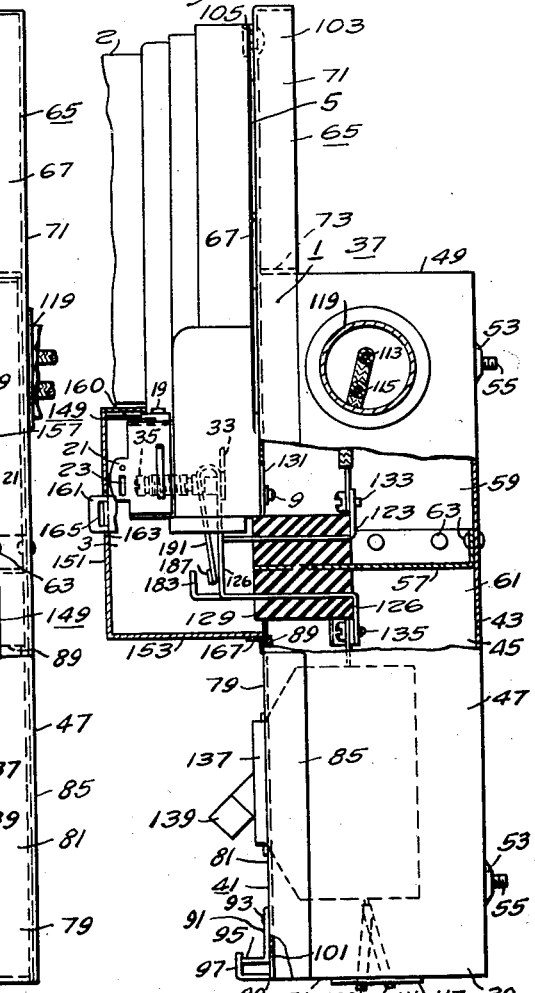
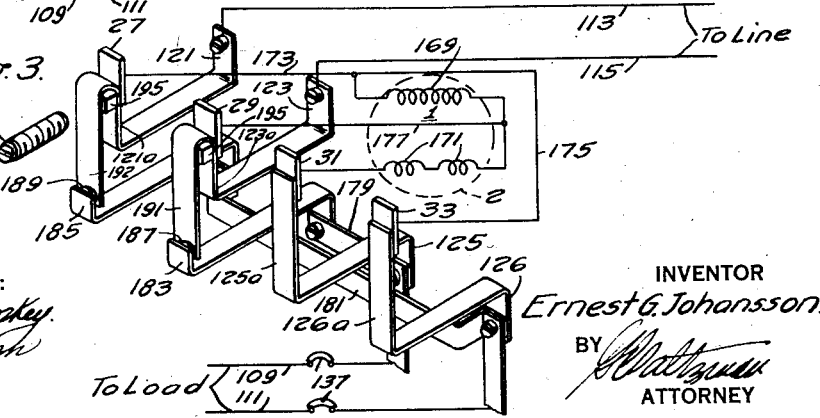
WITNESSES:
INVENTOR
Ernest G. Johansson.
BY
ATTORNEY

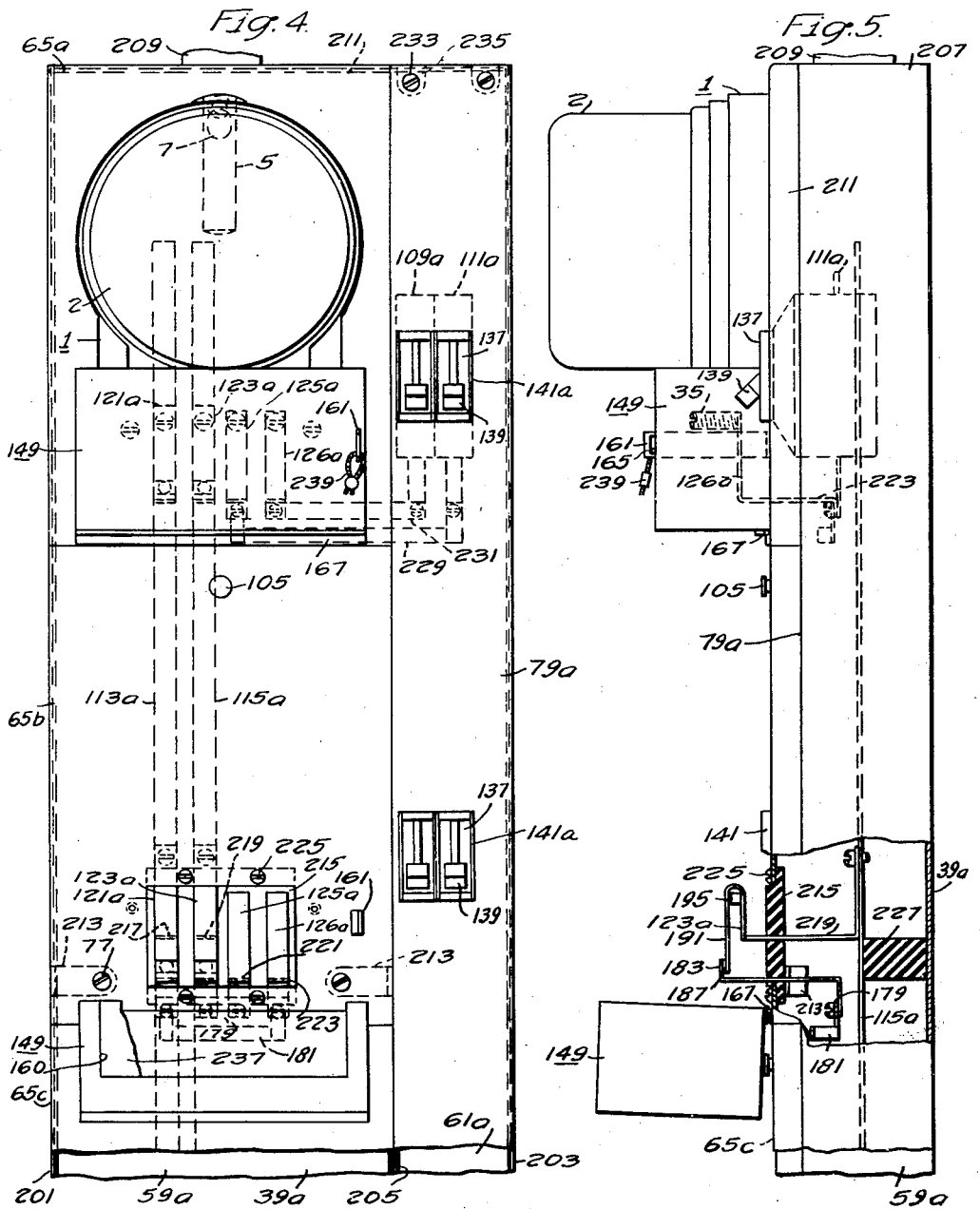

Patented Feb. 20, 1945

2,370,043

UNITED STATES PATENT OFFICE 2,370,043

METER MOUNTING

Ernest G. Johansson, Belmont, Mass., assignor to Anchor Manufacturing Company, Boston, Mass., a corporation of Massachusetts Application April 9, 1942, Serial No. 438,283

17 Claims. (Cl. 175—222)

This invention relates to mounting structures for electrical devices, and it has particular relation to receptacles for receiving electrical watthour meters of the bottom-connected type.

As generally encountered in practice, a bottom connected watthour meter has a row of female terminals through which the watthour meter is connected to suitable line and load conductors. Each of the female terminals is designed to receive a male contact element associated with one of the line or load conductors. Clamping means, generally in the form of a terminal screw, is provided for clamping each contact element to its associated female terminal.

When the bottom connected watthour meter is removed from service for any reason, such as for testing or for repairs, the terminal screws are actuated to release the contact elements, and the watthour meter is removed from the contact elements. Such removal results in an interruption in service to the electrical load energized through the watthour meter, and interruption in service often is objectionable.

In accordance with the invention, a mounting structure for a bottom connected watthour meter is provided with a circuit effective for connecting the line and load conductors prior to removal of the watthour meter from service. This circuit includes switch devices which are open when the watthour meter is in condition to establish a connection between the line and load conductors. The switch devices must be operated to closed condition prior to removal of the watthour meter from service. Such closure may be automatic or may be effected by associating the switch devices with the terminal screws of the watthour meter. This association is such that operation of the terminal screws to release the associated contact elements results in closure of the switch devices. Consequently, continuity of service to the load is assured under all conditions.

The invention further contemplates the segregation of the line and load conductors associated with a bottom connected watthour meter. As a result of such segregation, service equipment, such as fuses or switches, may be associated with the load conductors in proximity to the watthour meter. Such service equipment may be rendered accessible to the consumer without providing the consumer with access to the line conductors.

It is, therefore, an object of the invention to provide an improved mounting structure for an electrical device.

It is a further object of the invention to provide a mounting structure for a bottom-connected watthour meter having line and load conductors associated therewith, wherein a circuit is provided for connecting the line and load conductors prior to removal of the watthour meter from service.

It is another object of the invention to provide a mounting structure for a bottom-connected watthour meter, wherein line and load conductors associated with the watthour meter are segregated.

It is a still further object of the invention to provide a receptacle for receiving a bottom-connected watt-hour meter having a first compartment for receiving the line conductors connected to the watthour meter, and having a second compartment for the load conductors and service equipment associated with the watthour meter through which access cannot be obtained to the line conductors.

Other objects of the invention will be apparent from the following description taken in conjunction with the accompanying drawings, in which:

Figure 1 is a view in front elevation, with parts broken away, of a watthour meter assembly embodying the invention;

Fig. 2 is a view in side elevation, with parts broken away, of the assembly illustrated in Fig. 1;

Fig. 3 is a schematic view, with parts in perspective, illustrating electrical connections suitable for the assembly illustrated in Figs. 1 and 2;

Fig. 4 is a view in front elevation, with parts broken away, of a modified watthour meter assembly embodying the invention;

Fig. 5 is a view in side elevation, with parts broken away, of the assembly illustrated in Fig. 4; and Fig. 6 is a view in vertical cross-section, with parts broken away of a modified meter assembly.

Referring to the drawings, Fig. 1 shows a bottom connected watthour meter 1 having a cup-shaped cover 2 housing a watthour meter movement and having a terminal chamber 3 associated therewith. To facilitate the mounting of the watthour meter 1, a strap 5 having a keyhole slot 7 may be attached to the rear of the watthour meter. By means of this strap, the watthour meter may be hung upon a headed pin. If additional securing means is required, machine screws 9, or other suitable securing means, may be passed through the terminal chamber into engagement with a structure upon which the watthour meter 1 is mounted.

As well understood in the art, such a watthour meter may be designed to have its cover 2 removed by a rotary movement in a counterclockwise direction, as viewed in Fig. 1. To prevent unauthorized removal of the cover, the cover may be provided with a lug 11 which normally is restrained from movement by a stop 13 carried by a strap 15 which is bent in accordance with the contour of the terminal chamber 3. The strap 15 is provided with a slot 17 through which a pair of rivets 19 pass to permit a reciprocating movement of the strap 15 to the right, as viewed in Fig. 1, for a distance sufficient to clear the lug 11 and permit removal of the cover 2. The terminal chamber 3 may be covered by a small cover (not shown) having a slot for receiving a lug 21 carried by the strap 15. This lug has an opening 23 through which a sealing wire may be passed for preventing unauthorized removal of the cover or operation of the strap 15.

The terminal chamber 3 also contains an insulating block 25 which carries a pair of line terminals 27 and 29 and a pair of load terminals 31 and 33. In the conventional bottom connected watthour meter, the terminals 27, 29, 31 and 33 are female terminals designed to receive male contact elements. Clamping means generally in the form of a terminal screw 35 is provided for each of the terminals to facilitate the clamping of an associated contact element therein. The structure of the watthour meter 1 thus far specifically described is well known in the art, a typical example being illustrated in the Hagist Patent No. 2,094,356. Further examples of similar watthour meters are illustrated in the Bradshaw Patent No. 1,686,727 and the Ratz Patent No. 1,584,649.

For receiving the watthour meter 1, a mounting structure or receptacle 37 is provided which includes a base structure 39 and a cover structure 41. Conveniently, these structures may be formed of sheet metal, such as sheet steel.

The base structure 39 includes a rear wall 43, side walls 45 and 47, a top wall 49 and a bottom wall 51. These walls cooperate to form an open front rectangular box. If desired, the rear wall 43 may be provided with bosses 53 through which screws 55 project for attaching the base structure 39 to a building wall or other structural element.

By inspection of the drawings, it will be observed that the base structure 39 contains a barrier or partition wall 57 which divides the base structure into a line compartment 59 and a load compartment 61. The partition wall 57 may be attached to the base structure 39 in any suitable manner, as by rivets 63.

If desired, the cover structure 41 may take the form of a single cover member for the entire base structure. In the specific embodiment of Figs. 1 and 2, however, the cover structure 41 includes a cover member 65 which extends substantially over the line compartment 59. The cover member 65 includes a front wall 67, side flanges 69 and 71 and an intermediate flange 73. These flanges are designed to embrace closely the adjacent walls of the base structure 39.

The cover member 65 may be attached to the base structure 39 in any suitable manner. For the purpose of illustration, the partition wall 57 is provided with two brackets 75 having threaded openings. Machine screws 77 pass through the cover member 65 into threaded engagement with the brackets 75 to retain the cover member in position.

The cover structure 41 also includes a cover member 79 for the load compartment 61. This cover member includes a front wall 81, side flanges 83 and 85 and a bottom flange 87 designed to engage the associated walls of the base structure 39.

The cover member 79 may be attached to the base structure 39 in any suitable manner. For example, the cover member may have an offset tongue 89 designed to slip beneath the adjacent edge of the cover member 65 into engagement with the rear surface of the wall 67. In applying the cover member 79 to the base structure, the tongue 89 may be slipped beneath the adjacent edge of the cover member 65, and the cover member 79 then may be pivoted about this adjacent edge into the position illustrated in Figs. 1 and 2. The cover member 79 also carries a latch 91 which is pivoted to the wall 81 of the cover member by means of a rivet 93. The latch 91 has a flange 95 positioned to fit beneath the lip 97 of a locking member 99 secured to the base structure 39. The cover member 79 is provided with an opening 101 for permitting the passage of the locking member 99 therethrough. If desired, the flange 95 and the locking member 99 may be provided with aligned openings for receiving a padlock or other securing means. Consequently, after the cover member 79 has been pivoted into the position shown in Figs. 1 and 2, the latch 91 may be rotated into the position illustrated in Figs. 1 and 2 to retain the cover member in mounted position.

For mounting the watthour meter 1, the upper cover member 65 is provided with an extension 103 which carries a headed pin 105. The head of the pin 105 is designed to pass through the large opening of the keyhole slot 7, whereas the body of the pin is designed for reception in the smaller portion of the keyhole slot 7. Consequently, when the watthour meter 1 is slipped over the headed pin 105 and dropped slightly, the pin 105 retains the watthour meter 1 in mounted position. If further attachment of the watthour meter 1 is desired, the machine screws 9 may be introduced into threaded openings provided in the wall 67 of the cover member.

Load conductors 109 and 111 and line conductors 113 and 115 are positioned, respectively, in the load compartment 61 and the line compartment 59. These conductors may be introduced through knockouts in any of the walls of the base structure 39. For the purpose of illustration, the load conductors 109 and 111 are introduced through a conduit 117 attached to the bottom wall of the base structure 39, whereas the line conductors are introduced through a conduit 119 attached to the side wall 47 of the base structure.

To establish connections between the line and load conductors and the watthour meter, connector elements 121, 123, 125 and 126 extend from the compartments of the base structure through the cover structure 41. The connector elements 121 and 123 extend from the line compartment 59 through the cover structure, whereas the connector elements 125 and 126 extend from the load compartment 61 through the cover structure. The outer ends of the connector elements constitute male contact elements 121a, 123a, 125a and 126a designed for reception in the associated line and load terminals 27, 29, 31 and 33 of the watthour meter 1. These connector elements may be secured to the base structure 39 in any suitable manner. As illustrated, the connector elements are positioned in blocks of insulation material which are attached to the partition wall 57. Conveniently, the connector elements 123 and 126 may be embedded by a molding operation, together with the partition wall 57, in a single block 129 of a moldable insulating material, such as phenolic resin. By inspection of Fig. 2, it will be observed that the wall 67 of the upper cover member is provided with a window or opening 131 sufficiently large to permit passage of the cover member over the contact elements without disturbing the contact elements in any manner. The line conductors 113 and 115 may be attached to the connector elements 121 and 123 in any suitable manner, as by machine screws 133, which are in threaded engagement with the connector elements. Similarly, the load conductors may be connected to the connector elements 125 and 126 by machine screws 135.

As clearly shown in Fig. 2, the load compartment 61 is completely segregated from the line compartment 59. For this reason, access may be permitted the consumer to the load compartment 61 without danger of the consumer gaining access to the line conductors 113 and 115. For this reason, it is convenient to place service equipment, such as fuses or circuit breakers, in the load compartment 61. Preferably, this service equipment takes the form of one or more automatic overload circuit breakers 137 secured to the base structure 39, and having manual operating handles 139 projecting through a window 141 formed in the lower cover member 79. Circuit breakers similar to those herein contemplated are disclosed in United States Patents Nos. 2,204,409 and 2,132,629. Such circuit breakers are connected between the load conductors 109 and 111 and the connector elements 125 and 126 for controlling the supply of current from the watt-hour meter to a load. If it is desired to provide for future expansion of the number of circuit breakers employed in the load compartment 61, blanking covers 143 may be employed to cover the unoccupied portions of the window 141. These blanking covers each may have a tongue 145 underlying the wall 81 of the lower cover member and a pivotal latch 147 also underlying the wall 81. When it is desired to add additional circuit breakers to those present in the load compartment, the blanking covers 143 may be removed and additional circuit breakers installed as desired. Since the consumer may have access to the load compartment, such change may be effected by the consumer himself.

In order to cover the exposed portions of the connector elements, an auxiliary cover 149 coacts with the watthour meter 1 and the receptacle 41 to complete an enclosure for the exposed portions of the connector elements. The auxiliary cover 149 includes a front wall 151, a bottom wall 153, side walls 155 and 157 and a top wall 159. The top wall 159 is provided with an opening of sufficient size to receive the watthour meter 1. If desired, the top wall 159 may be provided with a peripheral groove 160 for the reception of a panel. As hereinafter pointed out, such a panel may be employed, when a watthour meter 1 is removed, to complete an enclosure for the connector and contact elements.

Securing of the auxiliary cover 149 to the cover structure 141 may be effected in any desired manner. For example, a strap 161 may be secured to the upper cover member 65 in any suitable manner as by welding. This strap has a portion extending through an opening 163 provided in the front wall 151 of the auxiliary cover. With such a construction, a sealing wire may be passed through an opening 165 provided in the strap 161 to prevent unauthorized removal of the auxiliary cover 149. It should be observed that this sealing provision is available regardless of the presence or absence of the watthour meter 1.

Since the auxiliary cover 149 generally will be retained in permanent association with the receptacle 41, it is preferable to attach the auxiliary cover thereto as by means of a hinge 167, through which the auxiliary cover is hinged on the upper cover member 65.

As previously explained, it is desirable that removal of the watthour meter 1 from the receptacle 41 should not interrupt the flow of current from the line conductors 113 and 115 to the load conductors 109 and 111. For this reason, an auxiliary circuit is provided for connecting the line conductors to the load conductors. This circuit includes switch means which is operated to closed condition in response to removal of the watthour meter 1 from the receptacle. The construction of the auxiliary circuit may be understood more clearly by reference to Fig. 3.

In Fig. 3, the watthour meter cover 2 is represented in dotted lines. The voltage winding 169 and the current windings 171 of the watthour meter are shown in position within the cover 2, although the arrangement of the windings may vary in accordance with standard practice. For the purpose of illustration, the watthour meter is assumed to be of the two-wire type. When the watthour meter is in mounted condition, a circuit is established from the line conductors to the load conductors which may be traced from one line conductor 113 through the connector element 121, the contact element 121a, the terminal 27, a conductor 173, a conductor 175, the terminal 33, the contact element 126a, the connector element 126, one of the circuit breakers 137 and the load conductor 111 to the load. The remainder of the circuit may be traced from the load through the load conductor 109, another of the circuit breakers 137, the connector element 125, the contact element 125a, the terminal 31, the current windings 171 of the watthour meter, a conductor 177, the terminal 29, the contact element 123a and the connector element 123 to the remaining line conductor 115. It will be observed that the voltage winding 169 is, in effect, connected across the terminals 27 and 29. Consequently, with these connections, energy will be supplied from the line conductors to the load, and this energy will be measured by the watthour meter.

In order to establish an auxiliary circuit between the line conductors and the load conductors when the watthour meter is removed from the receptacle 41, a pair of conductors 179 and 181 are connected, respectively, to the connector elements 125 and 126. These conductors terminate, respectively, in contacts 183 and 185 which are positioned adjacent the contact elements 123a and 121a. The contacts 183 and 185 cooperate with movable contacts 187 and 189 to form switches for connecting the connector elements 125 and 126 to the contact elements 123a and 121a. In a preferred embodiment of the invention, the movable contacts 187 and 189 are carried by arms 191 and 192 which are resiliently biased towards the contacts 183 and 185 for urging the associated pairs of contacts into engaged condition. Consequently, the arm 191 and the contact element 123a may be formed of a single strip of resilient conductive material, such as hard copper. As clearly illustrated in Fig. 3, the strip is bent into a substantially U-shape or hairpin configuration. The fold between the arm 191 and the contact element 123a is proportioned for reception in the associated female terminal 29. The arm 192 and the contact element 121a may be similarly proportioned.

When the watthour meter 1 is removed from its mounted position, a circuit is established between the line conductors 113 and 115 and the load conductors 109 and 111 which may be traced from the line conductor 113 through the connector element 121, the contact element 121a, the arm 192, the contacts 189 and 185, the conductor 181, and one of the circuit breakers 137 to the load conductor 111. The remainder of the circuit may be traced from the line conductor 115 through the connector element 123, the contact element 123a, the arm 191, the contacts 187 and 183, the conductor 179 and another of the circuit breakers 137 to the conductor 109. Consequently, current may be supplied to the load despite the absence of the watthour meter 1. When the watthour meter 1 is placed in mounted position, it is necessary that the current supplied to the load be directed through the watthour meter windings. This may be effected by separating the pairs of contacts 185, 189 and 183, 187. Such separation may be effected readily by operation of the terminal screws 35. It will be observed that the arms 191 and 192 are positioned in the paths of the associated terminal screws 35. Consequently, as the terminal screws are actuated to clamp the contact elements 121a and 123a in the terminals 27 and 29, the terminal screws engage the associated arms 191 and 192 and move the arms against their bias to separate the associated pairs of contacts. This interrupts the flow of current through the conductors 179 and 181 and directs the current through the windings of the watthour meter.

Since the terminal screws tend to secure the watthour meter 1 in mounted condition, they must be released prior to withdrawal of the watthour meter from its receptacle. The release of the terminal screws in turn frees the arms 191 and 192. Under the influence of their bias, these arms return into contact-making position. For this reason, removal of the watthour meter 1 automatically establishes an auxiliary circuit through the conductors 179 and 181 and assures continuity of service to the load.

In order to prevent excessive deflection of the arms 191 and 192, a block or stop 195 may be positioned between each of the arms 191 and 192 and the associated contact elements 123a and 121a. The stop may be formed of copper which is soldered or brazed to the associated arm or contact element. Preferably, the block is positioned in the line of travel of the associated terminal screw and permits a limited deflection of the associated arm.

It is believed that the operation of the structure shown in Figs. 1, 2 and 3 is apparent from the foregoing description. In installing the receptacle 37, the cover members 65 and 79 are removed, and the base structure 39 is attached to the building wall or other structural element designed for its reception by means of the screws 55. The conduits 117 and 119 then may be connected to the base structure, and the line and load conductors may be introduced therethrough into the respective compartments 61 and 59. Since the complete front of the base structure is open, the connections of the line and load conductors to the connector elements 121 and 123 and the circuit breakers 137 readily may be made.

After completion of the wiring operations, the upper cover member 65 is applied to the base structure 39 and attached thereto by means of the machine screws 77. The lower cover member 79 then may have its tongue 89 introduced beneath the adjacent edge of the upper cover member, and the cover member 79 may be pivoted into place on the base structure 39 to permit the latch 91 to be moved beneath the lip 97 of the locking element 99.

If the watthour meter is to be installed at a future date, a panel may be introduced in the groove 160 of the upper wall 159 forming part of the auxiliary cover 149, and the auxiliary cover may be pivoted about its hinge to cover the contact elements. With the auxiliary cover in this position, a seal may be introduced through the opening 165 of the strap 161 to secure the auxiliary cover in the closed position. If desired, strips of insulating material may be placed between the contacts 185 and 189 and between the contacts 183 and 187 to prevent the supply of electrical current therethrough.

If the watthour meter 1 is to be installed, the watthour meter is positioned with its terminal chamber 3 in position to receive the contact elements 121a, 123a, 125a, and 126a, and the watthour meter is dropped into the position illustrated in Figs. 1 and 2. During this operation, the pin 185 is received in the keyhole slot 7 to assist in supporting the watthour meter. The screws 9 then may be applied to fasten the watthour meter 1 securely to the receptacle 37.

Preferably, all of the contact elements are formed of a shape-retaining material, such as hard drawn copper. When so constructed, the contact elements always remain in proper alignment for reception in the female terminals 27, 29, 31 and 33 when the watthour meter 1 is dropped into mounted position.

To complete the connection of the watthour meter 1 to the conductors contained in the receptacle 37, the terminal screws 35 are actuated into clamping condition. Such actuation of the terminal screws automatically results in a movement of the arms 191 and 192 to separate the associated contacts 183, 187 and 185, 189. Therefore, current supplied from the conductors 113 and 115 to the load conductors 109 and 111 must pass through the watthour meter windings.

The auxiliary cover 149 next is pivoted into the position illustrated in Figs. 1 and 2. In this position, the auxiliary cover cooperates with the watthour meter 1 and the receptacle to form a complete enclosure for the contact elements. As previously pointed out, a sealing element may be introduced through the opening 165 of the strap 161 to maintain the auxiliary cover in closed position. It will be observed further that the heads of the screws 9 and 77 are positioned within the enclosure completed by the auxiliary cover 149. Consequently, sealing of the auxiliary cover prevents access to these screws.

It will be appreciated that a plurality of receptacles similar to that illustrated in Figs. 1 and 2 may be positioned in closely abutting side-by-side relationship to form a horizontal row of watthour meter receptacles. When so mounted, adjacent walls of the base structures 39 may be omitted as well understood in the art. Alternatively, a plurality of base structures may be associated in vertical alignment to provide a vertical row of meter positions. A modification illustrating such vertical alignment is illustrated in Figs. 4 and 5.

Referring to Figs. 4 and 5, a base structure 39a is disclosed which corresponds to the base structure 39 of Figs. 1 and 2. This base structure is provided with side walls 201 and 203. In addition, an intermediate partition wall 205 is provided for dividing the base structure into a line compartment 59a and a load compartment 61a. Since the base structure 39a is designed for a plurality of meter positions, the base structure may be made of unitary construction for its full length. End walls 207 may be provided at the extreme ends of the base structure and access to the compartments thereof may be had by connecting a conduit 209 to any of the walls at any desired point. A base structure of this general type is disclosed in the copending application of Sparkes and Johansson, Serial No. 374,668, filed January 16, 1941.

The line compartment 39a is provided with a plurality of cover members 65a, 65b and 65c. The cover member 65a is substantially similar in construction to the cover member 65 of Figs. 1 and 2, except for the omission of the intermediate flange 73. By inspection of Figs. 4 and 5, it will be observed that the base structure 39a extends for the full length of the cover member 65a. The intermediate cover members 65b and 65c are similar to the cover member 65a, except for the omission of the top flange 211 thereof. The cover members 65a, 65b and 65c may be attached to the base structure by means of the screws 77. These screws may engage threaded brackets 213 which are attached to the side wall 201 and the partition wall 205 of the base structure.

Each of the cover members 65a, 65b and 65c is designed to receive a bottom connected watthour member 1 in substantially the same manner as the cover member in Figs. 1 and 2. Only one of the watthour meters is illustrated in position on the cover member 65a in Figs. 4 and 5. The base structure in Figs. 4 and 5 is provided with a separate insulation block 215 for each of the cover members 65a, 65b and 65c. This insulation block corresponds to the insulation block 129 of Figs. 1 and 2 and carries connector elements 217, 219, 221 and 223 which correspond respectively to the connector elements 121, 123, 125 and 126 of Figs. 1 to 3. The connector elements of Figs. 4 and 5 are provided with contact elements 121a, 123a, 125a and 126a which are exactly similar to the corresponding elements of Figs. 1 to 3. Moreover, each of the contact elements 123a and 121a of Figs. 4 and 5 is associated with arms 191 and 192 and with contacts 183, 187, 185 and 189 in exactly the same manner as in Figs. 1 to 3. The insulation block 215 may be provided with threaded openings for receiving machine screws 225. These machine screws serve to attach the associated cover to the insulation block 215 after the cover has been placed in position on the base structure.

Because of the continuous open line compartment 59a, line buses 113a and 115a may be provided which extend the full length of the base structure. These buses may be supported at intervals on insulation blocks 227 which are attached in any suitable manner to the rear wall of the base structure. The connector elements 217 and 219 may be connected directly to the respective line buses 113a and 115a by means of suitable machine screws. The connector elements 221 and 223 are connected respectively to conductors 229 and 231 which pass through small openings in the partition wall 205. These conductors may be insulated or they may pass through insulated bushings in the partition wall 205. The conductors 229 and 231 are connected in turn to circuit breakers 137 which are positioned in the load compartment 61a. Suitable load conductors 109a and 111a are connected to the circuit breakers, and may be directed through a knockout provided at any desired point in the load compartment 61a.

By inspection of Figs. 4 and 5, it will be observed that the entire load compartment 61a is provided with a single cover member 79a. This cover member has windows 141a to permit the operating handles 139 of the circuit breakers 137 to project therethrough. The cover member may be attached to the base structure at suitable points by means of machine screws 233 which pass through the cover member into threaded engagement with brackets 235 attached to the adjacent walls of the base structure. With the construction illustrated in Figs. 4 and 5, removal of the single cover member 79a exposes the entire load compartment 61a. This greatly facilitates the installation of load conductors and service equipment.

Each of the cover members 65a, 65b and 65c is provided with a separate auxiliary cover 149 which is similar to the corresponding auxiliary cover of Figs. 1 to 3. Since no watthour meter is positioned on the cover member 65b, the associated auxiliary cover 149 is provided with a panel 237 which extends into the cover groove 160 to close the opening in the upper wall of the auxiliary cover normally occupied by the watthour meter. With the panel 237 in place, the auxiliary cover 149 may be pivoted into closed position and sealed to the associated strap 161 to prevent unauthorized access to the contact elements enclosed thereby. A seal 239 of the type commonly employed for watthour meter installations is shown for the cover member 65a of Figs. 4 and 5.

Except for the differences herein specifically pointed out, each of the watthour meters 1 employed for the cover members of Figs. 4 and 5 is associated with its contact elements in exactly the same manner as in Figs. 1 to 3. Moreover, the construction of the contact elements in Figs. 4 and 5, and of an auxiliary circuit connecting the line contact elements to the load contact elements, is substantially the same as the construction illustrated in Fig. 3. For these reasons, it is believed that the operation of the structure illustrated in Figs. 4 and 5 is apparent from the foregoing description.

By properly proportioning the male and female contact elements and terminals, connections for the bottom connected meter may be established and broken automatically. For example, in Fig. 6, a portion of a meter 1a, which corresponds to the meter 1 of Fig. 1, is illustrated in association with the contact element 121a. The meter has a female terminal 27a which corresponds to the terminal 27 of Fig. 1. The terminal 27a is proportioned to compress slightly the male contact element 121a when the latter is inserted therein in order to move the arm 192 automatically away from the contact 185. Because of its resiliency the contact 121a firmly engages the walls of the female terminal 27a. When the female terminal 27a is removed from the contact 121a, the resiliency of the latter urges the contact 189 into engagement with the contact 185.

Since the structure illustrated in Fig. 6 otherwise may be similar to that of Fig. 1, an extended discussion thereof appears unnecessary. If desired all of the male contact elements and female terminals may be similar to the contact element 121a and the terminal 127a. Such construction facilitates full automatic engagement and release of the contact elements and terminals.

Although the invention has been described with reference to certain specific embodiments thereof, numerous modifications are possible. Therefore, the invention is to be restricted only by the appended claims when interpreted in view of the prior art.

I claim as my invention:

1. In an electrical assembly, a receptacle including a base member and a cover member, an electrical device having terminal means movable to a mounted position externally of said receptacle and removable as a unit relative thereto, electroconductive means positioned within said receptacle, means connecting said terminal means to said electroconductive means, said connecting means including connector means extending through said cover member to engage said terminal means when said electrical device is in mounted position relative to said receptacle, auxiliary cover means completing an enclosure for said connector means when said electrical device is in mounted position, and means coacting with said auxiliary cover means to complete an enclosure for said connector means when said electrical device is removed from said mounted position.

2. In an electrical assembly, a receptacle including a base member and a cover member, an electrical device having female terminal means movable to a mounted position externally of said receptacle and removable as a unit relative thereto, electroconductive means positioned within said receptacle, means connecting said female terminal means to said electroconductive means, said connecting means including male connector means extending through said cover member for reception in said female terminal means when said electrical device is in mounted position relative to said receptacle, auxiliary cover means completing an enclosure for said connector means when said electrical device is in mounted position, means coacting with said auxiliary cover means to complete an enclosure for said connector means when said electrical device is removed from said mounted position, and means fastening said auxiliary cover means to said receptacle for impeding unauthorized opening thereof.

3. In a structure for mounting an electrical meter of the type having a row of screw-operated terminals for receiving line and load connections, a receptacle including a base member and a cover member, a plurality of line and load conductors positioned within said receptacle, a separate connector member extending from each of said conductors through said cover member, said separate connector members each terminating in a contact element positioned for reception in a separate one of a row of screw-operated terminals of a meter when a meter is placed in mounted position relative to said receptacle, an auxiliary cover element forming an enclosure for the portions of said connector members extending through said cover member including said contact elements, means hinging said auxiliary cover element on said cover member for movement from a first position enclosing said contact elements to a second position exposing said contact elements for reception in the terminals of a meter, said auxiliary cover element having portions configured to cooperate with a meter when a meter is in mounted position relative to said receptacle to prevent access to said connector members.

4. In an electrical assembly, a male contact element, an electrical device having a female terminal proportioned to receive therein said male contact element, said electrical device having releasable clamping means operable for urging the female terminal into firm engagement with said male contact element when said male contact element is positioned in said female terminals, said male contact element comprising switch means, and means responsive to operation of said clamping means for actuating said switch means.

5. In an electrical assembly, a male contact element, an electrical device having a female terminal proportioned to receive therein said male contact element, said electrical device having releasable clamping means operable for urging the female terminal into firm engagement with said male contact element when said male contact element is positioned in said female terminals, said male contact element comprising an actuating member extending into said female terminal, said actuating member being yieldably positioned in the path of operation of said clamping means for movement in response to operation of said clamping means, and switch means responsive to said movement of said actuating member.

6. In an electrical assembly, a male contact element, an electrical device having a female terminal proportioned to receive therein said male contact element, said electrical device having releasable clamping means operable for urging the female terminal into firm engagement with said male contact element when said male contact element is positioned in said female terminals, said male contact element comprising a resilient electroconductive member having a folded substantially U-shape proportioned for insertion into said female terminal to be clamped therein by said clamping means, said electroconductive member having its ends positioned for relative movement in response to operation of said clamping means, and switch means responsive to relative movement of said ends.

7. In an electrical assembly, an electrical device having a female terminal, a mounting unit for said electrical device, said mounting unit having a male contact element comprising portions movable with respect to each other, said portions being resiliently biased in engagement with the interior surface of said female terminal, the bias of said portions operating to produce relative movement therebetween when said female terminal and said contact element are separated, and switch means responsive to the movement between said portions for controlling a circuit normally connected to said device.

8. In an electrical metering assembly; an electrical meter having screw-operated female line and load terminals; and means for selectively transmitting current to a load either through said electrical meter or through a bypass circuit, said means including a male line contact element and a male load contact element positioned for reception in said line and load female terminals, and electroconductive means extending between said contact elements for bypassing current away from said electrical meter, one of said contact elements comprising a resilient, electroconductive U-shaped member having an arm biased towards said electroconductive means and engaged with said electroconductive means when the associated terminal screw is in retracted condition, said arm being disposed for movement away from said electroconductive means in response to actuation of the associated terminal screw into position for clamping the associated contact element.

9. In an electrical metering assembly; an electrical meter having screw-operated female line and load terminals; and means for selectively transmitting current to a load either through said electrical meter or through a bypass circuit, said means including a male line contact element and a male load contact element positioned for reception in said line and load female terminals, electroconductive means extending between said contact elements for bypassing current away from said electrical meter, one of said contact elements comprising a resilient, electroconductive U-shaped member having a first arm biased towards said electroconductive means and engaged with said electroconductive means when the associated terminal screw is in retracted condition, said arm being disposed for movement away from said electroconductive means in response to actuation of the associated terminal screw into position for clamping the associated contact element, said U-shaped member having a second arm, and stop means positioned between said arms adjacent the associated terminal screw for controlling the degree of relative movement therebetween as said terminal screw is actuated.

10. In an electrical metering assembly, an electrical meter having female load and line terminals designed for reception of male contact elements extending parallel to the base of the meter; and mounting means for said electrical meter, said mounting means comprising a receptacle having a base member and a cover member, conductive means positioned in said receptacle, a plurality of male contact elements extending through said cover member for connecting said electrical meter to said conductive means, said contact elements having portions extending parallel to the plane of said cover member for reception in said female terminals, means for securing said electrical meter in mounted position on the outer side of said cover member, said cover member having an opening permitting complete passage of said contact elements therethrough when said cover member is attached to or removed from said base member, and means coacting with said cover member and said electrical meter for enclosing said contact elements.

11. In an electrical metering assembly, a bottom-connected electrical meter having female load and line terminals designed for the reception of contact elements extending parallel to the base of the meter, and having a housing for said terminals; and mounting means for said electrical meter comprising a receptacle having a base member and a cover member, means securing said electrical meter in mounted position on the outer side of said cover member, a plurality of male contact elements passing through said cover member and positioned for reception in said female terminals, and a single auxiliary cover extending completely over said male contact elements and over said housing for completing an enclosure for said contact elements.

12. In an electrical assembly, a receptacle including a base structure and a cover structure, partition means in said receptacle for dividing said receptacle into a plurality of compartments each closed by said cover structure, first conductor means positioned in a first one of said compartments, second conductor means positioned in a second one of said compartments, said first compartment being substantially inaccessible from said second compartment, an auxiliary housing positioned on said cover structure, an electrical device associated with said auxiliary housing, connector elements extending from each of said conductor means through said cover structure into said auxiliary housing for connecting said electrical device to both of said conductor means, and circuit control means positioned in said second compartment for connection to said second conductor means.

13. In an electrical metering assembly; a receptacle including a base structure, a partition dividing said base structure into a pair of compartments, and a cover structure comprising a substantially separate cover member for each of said compartments; line conductor means positioned in a first one of said compartments, load conductor means positioned in a second one of said compartments, said first compartment being substantially inaccessible from said second compartment, a bottom-connected electrical meter positioned on the cover member for said first compartment, said electrical meter having a plurality of line and load female terminals, connector elements extending from each of said conductor means through said cover structure, said connector elements having male contact elements positioned for reception in the line and load female terminals of said electrical meter, auxiliary cover means cooperating with said electrical meter for enclosing the portions of said connector elements projecting through said cover structure, and circuit interrupting means positioned in said second compartment for controlling the supply of load current by said load conductor means.

14. In an electrical metering assembly; a receptacle including a base structure, a partition dividing said base structure into first and second compartments, and a cover structure comprising a substantially separate cover member for each of said compartments; line conductor means positioned in said first compartment, load conductor means positioned in said second compartment, said first compartment being substantially inaccessible from said second compartment; a bottom-connected meter positioned on the cover member for said first compartment, said electrical meter having a plurality of line and load terminals, and having releasable clamping means associated therewith operable for clamping contact elements to said terminals when said meter is in mounted position relative to said cover member; and means for connecting said load conductor means to said line conductor means selectively through either said electrical meter or through a bypass circuit independent of said electrical meter, said connecting means comprising connector elements extending from each of said conductor means through said cover structure, said connector elements having contact elements positioned for engagement with said line and load terminals to establish a circuit connecting said line conductor means and said load conductor means through said electrical meter, a bypass circuit connecting said line conductor means to said load conductor means independently of said electrical meter, said bypass circuit including an electrical switch, and means responsive to a clamping operation of said clamping means for opening said electrical switch to render said bypass circuit ineffective.

15. In an electrical metering assembly, a receptacle including a base structure, a partition dividing said base structure into first and second compartments, and a cover structure comprising a substantially separate cover member for each of said compartments; line conductor means positioned in said first compartment, load conductor means position in said second compartment, said first compartment being substantially inaccessible from said second compartment, a bottom-connected meter positioned on the cover member for said first compartment, said electrical meter having a plurality of line and load female terminals, and having clamping means associated therewith for clamping contact elements to said terminals; and means for connecting said load conductor means to said line conductor means selectively through either said electrical meter or through a bypass circuit independent of said electrical meter, said connecting means comprising connector elements extending from each of said conductor means through said cover structure, said connector elements having male contact elements positioned for engagement with said line and load female terminals to establish a circuit connecting said line conductor means and said load conductor means through said electrical meter, a bypass circuit connecting said line conductor means to said load conductor means independently of said electrical meter, said bypass circuit including an electrical switch, an auxiliary cover cooperating with said electrical meter for establishing a protective enclosure for the portion of said connector elements projecting through said cover structure, means securing said auxiliary cover to the cover member for said first compartment, circuit interrupting means positioned in said second compartment for controlling the supply of load current by said load conductor means, and means responsive to a clamping operation of said clamping means for opening said electrical switch to render said bypass circuit ineffective.

16. In an electrical metering assembly; a receptacle including a base structure, a partition dividing said base structure into first and second compartments, and a cover structure comprising a substantially separate cover member for each of said compartments; line conductor means positioned in said first compartment, load conductor means positioned in said second compartment, said first compartment being substantially inaccessible from said second compartment; a bottom-connected meter positioned on the cover member for said first compartment, said electrical meter having a plurality of line and load terminals; and means for connecting said load conductor means to said line conductor means through said electrical meter, said connecting means comprising connector elements extending from each of said conductor means through said cover structure, said connector elements having contact elements permanently positioned for engagement with said line and load terminals to establish a circuit connecting said line conductor means and said load conductor means through said electrical meter, and insulating means secured to said partition for guiding said connector elements through said cover structure and for properly positioning said connector elements and contact elements.

17. In a mounting unit for receiving an electrical device of the type having female terminal elements, a supporting structure, a plurality of male contact elements positioned on said supporting structure, and circuit connection means extending between certain of said male contact elements for establishing circuit connections therebetween, said circuit connection means including means responsive to constriction of one of said male contact elements for interrupting said circuit connections, whereby when said one of said male contact elements is constricted in one of said female terminal elements said circuit connections are interrupted.

ERNEST G. JOHANSSON.